(12) United States Patent
Baumann et al.

(10) Patent No.: US 7,322,793 B2
(45) Date of Patent: Jan. 29, 2008

(54) TURBINE MOTOR OF A ROTARY ATOMIZER

(75) Inventors: Michael Baumann, Weinbergsteige 4 (DE); Frank Herre, Oberriexingen (DE); Hans J. Nolte, Stuttgart (DE); Harry Krumma, Bonnigheim (DE); Stefano Giuliano, Gerlinger (DE); Björn Lind, Gothenburg (SE)

(73) Assignee: Behr Systems, Inc., Auburn Hills, MI (US)

( * ) Notice: Subject to any disclaimer, the term of this patent is extended or adjusted under 35 U.S.C. 154(b) by 835 days.

(21) Appl. No.: 10/624,173

(22) Filed: Jul. 22, 2003

(65) Prior Publication Data

US 2004/0164190 A1  Aug. 26, 2004

(30) Foreign Application Priority Data

Jul. 22, 2002 (DE) .............................. 102 33 199

(51) Int. Cl.
 *F01D 1/08* (2006.01)
(52) U.S. Cl. ..................................... 415/202
(58) Field of Classification Search ................ 415/202, 415/203; 416/185, 186 R
 See application file for complete search history.

(56) References Cited

U.S. PATENT DOCUMENTS

| | | | |
|---|---|---|---|
| 2,411,798 A * | 11/1946 | Matthews ................... | 415/117 |
| 4,022,423 A * | 5/1977 | O'Connor et al. .......... | 251/127 |
| 4,355,949 A * | 10/1982 | Bailey ......................... | 415/35 |
| 4,376,135 A | 3/1983 | Patel et al. ................. | 427/31 |
| 4,521,462 A | 6/1985 | Smythe ....................... | 427/421 |
| 4,572,437 A | 2/1986 | Huber et al. ................ | 239/703 |
| 4,589,597 A | 5/1986 | Robisch et al. ............. | 239/703 |
| 4,684,064 A | 8/1987 | Kwok ......................... | 239/223 |
| 4,715,314 A | 12/1987 | Ramseier et al. ........... | 118/631 |
| 4,811,906 A | 3/1989 | Prus | |
| 4,852,810 A | 8/1989 | Behr et al. .................. | 239/703 |
| 4,919,333 A | 4/1990 | Weinstein ................... | 239/223 |
| 4,927,081 A | 5/1990 | Kwok et al. ................ | 239/223 |
| 4,944,459 A | 7/1990 | Watanabe et al. ........... | 239/305 |

(Continued)

FOREIGN PATENT DOCUMENTS

DE  696 11 582 T2  8/2001

(Continued)

OTHER PUBLICATIONS

International Search Report dated Apr. 3, 2007.

*Primary Examiner*—Edward K. Look
*Assistant Examiner*—Devin Hanan
(74) *Attorney, Agent, or Firm*—Howard & Howard Attorneys, P.C.

(57) ABSTRACT

A turbine, e.g., with a blade arrangement, which receives an air flow in the radial direction and which is located on a carrier surface of the turbine wheel, is used as a drive motor for a rotary atomizer. The drive channel, which contains the turbine blades and which is limited by the carrier surface, is also closed on its other side by a cover element, which is attached to the turbine wheel and which rotates with the wheel for increasing efficiency. For an additional increase in efficiency, the inlet for the drive air of the turbine is configured as an ultrasonic nozzle with a cross section that expands continuously up to the opening.

8 Claims, 1 Drawing Sheet

U.S. PATENT DOCUMENTS

Figure 1:
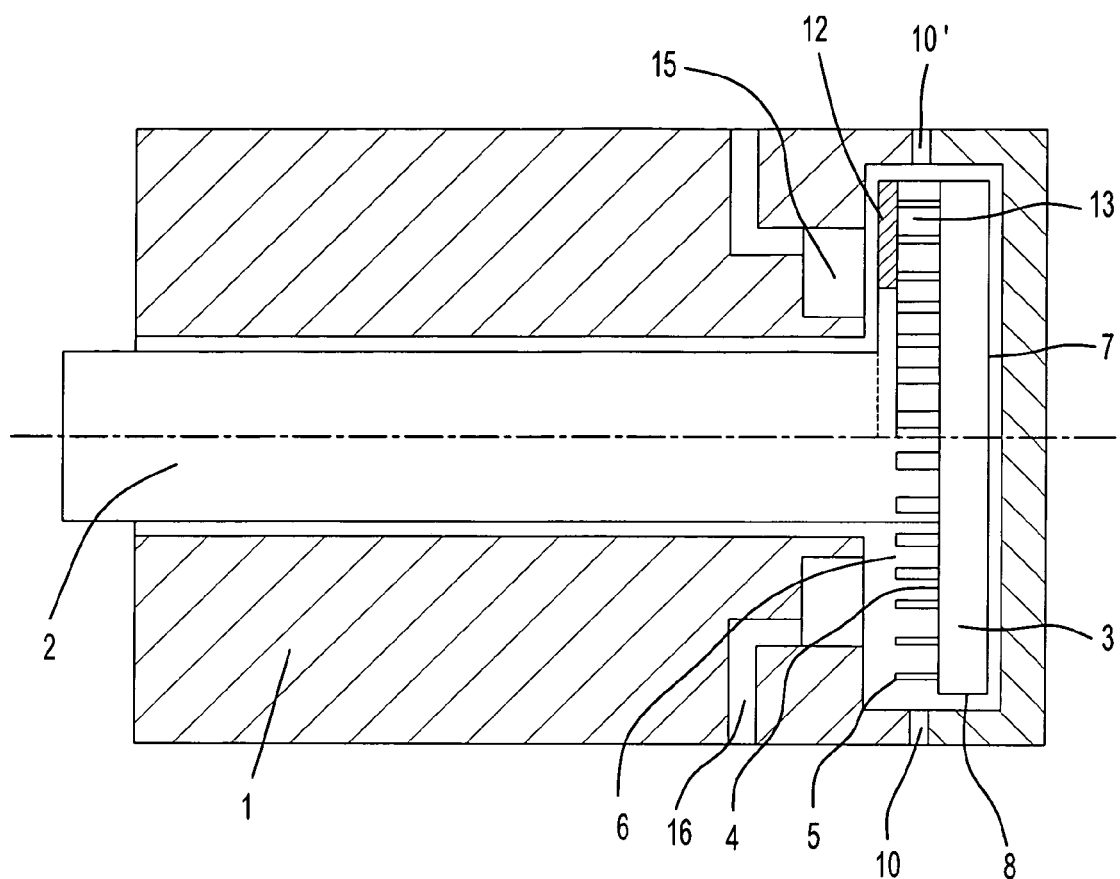

| | | | |
|---|---|---|---|
| 4,955,960 A | 9/1990 | Behr et al. | 239/3 |
| 5,011,086 A | 4/1991 | Sonnleitner et al. | 239/691 |
| 5,078,321 A | 1/1992 | Davis et al. | 239/224 |
| 5,127,125 A | 7/1992 | Skibowski | 15/104.061 |
| 5,294,217 A | 3/1994 | Talacko et al. | 406/91 |
| 5,300,006 A | 4/1994 | Tanaka et al. | 483/56 |
| 5,397,063 A | 3/1995 | Weinstein | 239/703 |
| 5,622,563 A | 4/1997 | Howe et al. | 118/620 |
| 5,633,306 A | 5/1997 | Howe et al. | 524/409 |
| 5,662,278 A | 9/1997 | Howe et al. | 239/700 |
| 5,683,032 A | 11/1997 | Braslaw et al. | 239/7 |
| 5,704,977 A | 1/1998 | Baumann et al. | 118/323 |
| 5,865,380 A | 2/1999 | Kazama et al. | 239/704 |
| 6,037,010 A | 3/2000 | Kahmann et al. | 427/421 |
| 6,090,450 A | 7/2000 | Kahmann et al. | 427/421 |
| RE37,233 E * | 6/2001 | Chancellor et al. | 417/423.7 |
| 6,508,610 B2 | 1/2003 | Dietrich | 406/13 |
| 6,589,348 B2 | 7/2003 | Ott | 118/684 |

FOREIGN PATENT DOCUMENTS

| | | |
|---|---|---|
| EP | 0 567 436 A1 | 10/1993 |
| EP | 0 761 977 A1 | 3/1997 |
| GB | 885367 | 12/1961 |
| RU | 2 008 435 C1 | 2/1994 |

\* cited by examiner

TURBINE MOTOR OF A ROTARY ATOMIZER

PRIOR APPLICATIONS

This application claims priority to German Patent Application No. DE 102 33 199.5 filed Jul. 22, 2002.

FIELD OF THE INVENTION

The invention concerns a turbine motor that can be used as the drive for the bell-shaped Plate of a rotary atomizer according to the preamble of claim 1. More specifically, it concerns high-speed rotary atomizers for the electrostatic mass-production coating of workpieces, such as vehicle chassis.

BACKGROUND

Radial turbines, which are operated in a known way with compressed air and which have a hollow shaft that carries the bell-shaped plate and that rotates in an air bearing, are used for driving the bell-shaped plate of such atomizers (DE 43 06 80, EP 0 796 663 B1). Air can either flow against the radial turbines in the tangential direction or through the turbines in the radial direction. In the latter case, the turbine wheel consists of a disk, which rotates in an essentially closed cylindrical interior of the bearing unit of the drive shaft and which has turbine blades formed on its end surface near the periphery. The driving air flows through the turbine blades in the radial direction within a channel, which is limited on one side by the turbine wheel and, in the known case, on its opposite side by a stationary part of the bearing unit. The driving air is guided into this drive channel through one or more supply channels, which open into a nozzle, whose opening, e.g., with a rectangular cross section, represents in the known case the smallest cross section of the associated driving-air supply. There is an air gap between the axial ends of the turbine blades and the stationary part of the bearing unit through which a portion of the driving air for the drive is lost. Another disadvantage is a turbulent boundary layer, which forms between the flowing driving air and the stationary housing part for the considered known radial turbine and causes high friction losses. Consequently, the efficiency of the known radial turbine is limited.

SUMMARY OF THE INVENTION

The invention is based on the problem of providing a turbine motor for a rotary atomizer, which enables a higher driving efficiency than for comparable, known radial turbines.

This problem is solved by the turbine motor characterized in the claims.

The turbine is significantly improved by the invention in terms of flow. In particular, because the drive channel is not limited on only one side as before, but instead is also closed on the other side by an element that rotates with the turbine, the drive air can flow through the closed channel without losses and with low friction. An advantageous possibility for realization is to limit the drive channel by a disk, which is attached to the turbine wheel and/or to the drive shaft, which rotates with the wheel, and which can form or contain at least one outlet opening for the driving air on the inside in the radial direction.

According to another feature of the invention, the cross-sectional area of the inlet opening through which the driving air flows from a supply channel of the bearing unit into the drive channel of the turbine should be greater than the cross-sectional area of the supply channel at its point of smallest cross section. In particular, the inlet can be configured as a so-called Laval or ultrasonic nozzle, whose cross section first narrows and then expands to generate gas flow rates that can lie, at least theoretically, in the ultrasonic range. Surprisingly, it has been determined that the resulting changes in speed and pressure of the incoming air lead to a significant improvement of the driving efficiency of the turbine in comparison with the previously conventional nozzles.

The turbine can be optimized in terms of flow by the invention, which can provide, above all, a higher rpm than before. For a rotary atomizer, a higher outflow rate of the coating material at the bell-shaped plate driven by the turbine is achieved with the higher rpm.

Preferably, the mass of the entire exchangeable motor unit (without bell-shaped plate), known as a modular-type construction unit, is less than 0.8 kg, which was previously possible only for significantly lower-power turbines of the considered class.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 shows a section through the bearing unit of a rotary atomizer along the axis of the drive shaft in a schematically simplified illustration.

DETAILED DESCRIPTION OF THE INVENTION

The bearing unit forming the turbine motor described here has a stationary housing 1, in which the drive shaft 2 rotates in an air bearing formed between the housing and the shaft. The disk-shaped turbine wheel 3 is arranged at one end of the drive shaft 2. The ring of turbine blades 5 for flow in the radial direction is formed on an annular area of the axial end surface 4 of the turbine wheel facing the shaft lying near the periphery of the disk. The turbine wheel 3 rotates in a cylindrical interior 6 of the housing 1 dimensioned corresponding to the turbine wheel with walls adjacent to the rear flat end surface 7 and the cylindrical peripheral surface 8 of the turbine wheel. On the opposite side, on the left in the drawing, the interior 6 is limited by another wall surface of the stationary housing 1 running in the radial direction, which forms the opening for the shaft 2 in the center and which is positioned, outside of this opening, opposite the axial end surface 4 of the turbine wheel 3 at the illustrated axial distance from the ends of the turbine blades 5 in the radial direction. Outside of the circumference of the turbine wheel 3 in the radial direction and aligned with the turbine blades 5 in the axial direction, an inlet 10 opens into the interior 6 for the drive air of the turbine, which comes out of a supply channel running through the housing 1. Another air inlet can be provided at 10'. Typically, the housing 1 contains separate inlets for driving air and braking air (EP Application No. 02006826.8). The drive shaft can be configured as a hollow shaft and the (not-illustrated) bell-shaped plate of the rotary atomizer is screwed into the other end of the drive shaft.

As described thus far, the illustrated bearing unit can correspond to the state of the art of conventional rotary atomizers. However, according to the invention, a circular ring-shaped cover disk 12 is attached to the turbine wheel 3 on the side of the end surface 4. This cover disk directly contacts to the ends of the turbine blades 5 projecting from the end surface 4 in the axial direction and rotates with the blades. To explain the differences from the state of the art, only its top half is illustrated. The cover disk 12 can be adhered, welded, or attached in some other way, e.g., to the ends of the turbine blades 5 extending in the axial direction. Thus, a drive channel 13 closed in the axial direction on both sides of the turbine blades 5 is formed between the end surface 4 and this cover disk 12, in which the compressed air, which is fed from the air inlet 10 in a direction that is at least approximately tangential and if necessary with a component directed inwards in the radial direction, flows without loss and with low friction between the turbine blades. The air released after the delivery of the drive energy to the shaft flows within the annular surface area containing the turbine blades in the radial direction into one or more recesses 15 and channels 16 of the housing 1 acting as air outlets.

It is conceivable to provide turbine blades in the described, closed drive channel not only on one side, but also on both sides of the turbine wheel. Likewise, it is possible to arrange more than just one turbine on a common shaft.

The cross-sectional area of the opening at the air inlet 10, thus at the outlet point of the drive air, is preferably greater than the smallest cross section of the upstream channels of the bearing unit, in which the drive air is guided in a known way through at least one hole in an annular segment-shaped supply channel and from this channel into one or more nozzles. In contrast to conventional nozzles with a cross section that narrows constantly up to the opening, which can accelerate the flowing medium only up to a speed that is less than the speed of sound, the air inlet 10 is configured as a Laval nozzle, e.g., whose cross section first narrows and then expands up to the opening in order to generate ultrasonic speeds in the expanded nozzle section. Such ultrasonic nozzles can be advantageous not only for the radial turbines described here, but also for other types of turbine motors in order to increase the efficiency.

The described embodiment can be modified in various ways within the scope of the invention. If the turbine wheel consists of two disk elements that are separated in the axial direction, these can be connected by axial crosspieces, e.g., at the periphery, between which there are open passage openings for air flow, so that the drive channel formed between the disk elements is partially closed also at the periphery of the turbine wheel. Furthermore, instead of inside one of the disk elements in the radial direction, the outlet for the drive air can be located at any other arbitrary position and, if necessary, also outside of the turbine wheel in the radial direction.

In addition, the invention is limited neither to the described tangential or radial direction of incoming air nor to two spatially separated disks nor to a certain shape of the blade elements. For example, the blade elements can be arranged between a closed cylindrical surface at the periphery of the turbine wheel and an inner, similarly closed and cylindrical surface that is spatially separated from the other surface in the radial direction, so that a drive channel limited in the radial direction on two sides is formed, with the blade elements receiving air flow in the axial direction and with air outlets being able to be located at the opposite end of the annular drive channel in the axial direction.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

The invention claimed is:

1. A gas turbine motor for use as a drive for a bell-shaped plate of a rotary atomizer comprising:
- a housing with an outlet;
- a drive shaft of said motor having a bearing unit;
- a turbine wheel drivably mounted upon said drive shaft rotatably disposed within a drive channel of said housing and having a plurality of blade elements secured to and extending from a carrier surface;
- a gas inlet aligned with said blade elements receiving a driving gas under pressure through said housing and into driving contact with said blade elements of said turbine wheel; and
- a substantially flat shielding element fixed to the free ends of said blade elements opposed to said carrier surface and without contacting the carrier surface, thereby limiting said drive channel.

2. A turbine motor according to claim 1, wherein said turbine wheel is formed by two disk elements comprising said carrier surface and said shielding element lying in an opposed relationship in an axial direction and being limited by said drive channel.

3. A turbine motor according to claim 1, wherein said shielding element comprises a disk operably connected to one of said drive shaft and said turbine wheel thereby rotating with said turbine wheel.

4. A turbine motor according to claim 1, wherein said shielding element is welded to said turbine blades.

5. A turbine motor according to claim 1, wherein said shielding element defines at least one outlet for said driving gas.

6. A turbine motor according to claim 5, wherein said opening defined by said shielding element includes a cross-sectional area greater than a smallest cross-sectional area of said inlet.

7. A turbine motor according to claim 6, wherein said inlet is configured as a Laval nozzle having a cross-section expanding after narrowing adjacent said opening leading into the drive channel.

8. A turbine motor according to claim 1, wherein said inlet for driving gas is positioned in said housing spaced from said drive shaft in a radial direction.

* * * * *